United States Patent
Oiwa

(10) Patent No.: US 7,369,823 B2
(45) Date of Patent: May 6, 2008

(54) RECEPTION APPARATUS

(75) Inventor: Koji Oiwa, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 108 days.

(21) Appl. No.: 10/994,341

(22) Filed: Nov. 23, 2004

(65) Prior Publication Data

US 2005/0113143 A1   May 26, 2005

(30) Foreign Application Priority Data

Nov. 25, 2003   (JP) .............................. 2003-393668

(51) Int. Cl.
*H04B 17/02* (2006.01)

(52) U.S. Cl. .................. 455/135; 455/132; 455/101; 348/565; 348/731

(58) Field of Classification Search ........ 455/132–135, 455/143, 150.1, 161.1, 161.3, 166.2, 182.3, 455/189.1, 277.1, 101; 725/78, 85; 348/24, 348/564–565, 731
See application file for complete search history.

(56) References Cited

U.S. PATENT DOCUMENTS

| | | | | |
|---|---|---|---|---|
| 5,818,543 A * | 10/1998 | Lee | ............................. | 348/725 |
| 6,556,252 B1 * | 4/2003 | Kim | ........................... | 348/565 |
| 7,124,365 B2 * | 10/2006 | Cavallerano et al. | ....... | 715/716 |
| 2002/0039393 A1 * | 4/2002 | Shibata et al. | .............. | 375/316 |
| 2004/0229581 A1 * | 11/2004 | Mizoguchi et al. | ......... | 455/136 |
| 2005/0052578 A1 * | 3/2005 | Phillips et al. | .............. | 348/584 |
| 2005/0128362 A1 * | 6/2005 | Teichner et al. | ............ | 348/725 |
| 2005/0185097 A1 * | 8/2005 | Takatori et al. | ............. | 348/570 |
| 2006/0023123 A1 * | 2/2006 | Yen et al. | .................... | 348/705 |
| 2006/0135099 A1 * | 6/2006 | Hoda et al. | .............. | 455/179.1 |

FOREIGN PATENT DOCUMENTS

JP   03214821 A * 9/1991
JP   10-84297 A   3/1998

* cited by examiner

*Primary Examiner*—Duc M. Nguyen
*Assistant Examiner*—Anthony S. Addy
(74) *Attorney, Agent, or Firm*—Birch, Stewart, Kolasch & Birch, LLP

(57) ABSTRACT

A comparison circuit 13x compares signals from demodulator circuits 11a and 11b and thereby compares the reception condition of the antennas 1a and 1b. The tuner circuit corresponding to the antenna that is yielding better reception condition selects the channel to be displayed on a main screen, and the tuner circuit corresponding to the other antenna selects the channel to be displayed on a sub screen.

5 Claims, 6 Drawing Sheets

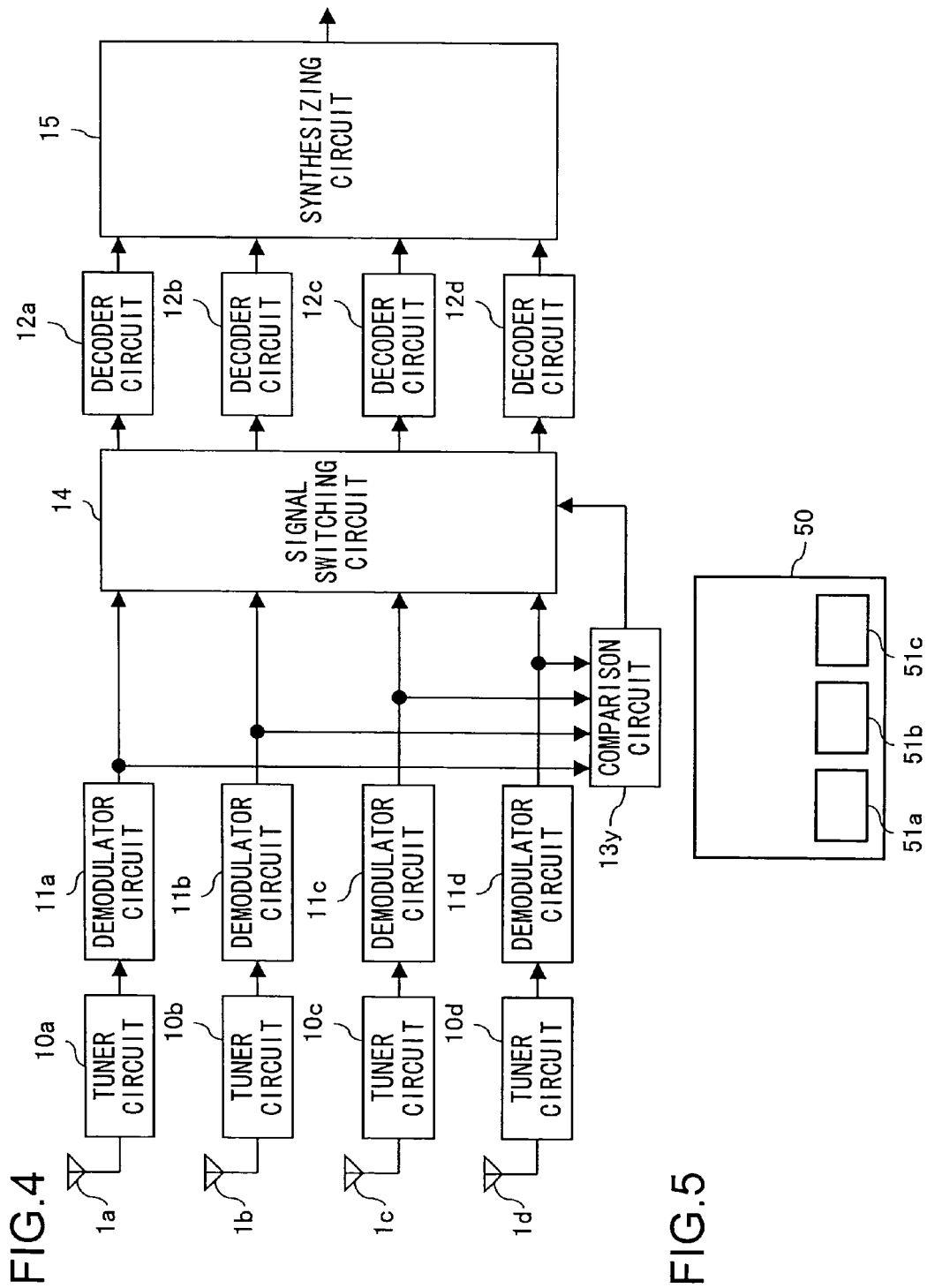

RECEPTION APPARATUS

This nonprovisional application claims priority under 35 U.S.C. § 119(a) on Patent Application No. 2003-393668 filed in Japan on Nov. 25, 2003, the entire contents of which are hereby incorporated by reference.

BACKGROUND OF THE INVENTION

1. Field of the Invention

The present invention relates to a reception apparatus that adopts a diversity system involving a plurality of antennas, and more particularly to a reception apparatus for reproducing pictures.

2. Description of Related Art

A conventional reception apparatus is provided with a tuner circuit 10, which includes: a BPF (band-pass filter) 2 that selects from the radio-frequency signals received via an antenna 1 those within a desired frequency band; an RF amplifier 3 that amplifies the radio-frequency signals that have passed through the BPF 2; a BPF (band-pass filter) 4 that selects from the radio-frequency signals amplified by the RF amplifier 3 those within the desired frequency band; a mixer 5 that selects from the radio-frequency signals having passed through the BPF 4 the broadcast signal having a desired channel frequency; a VCO (voltage-controlled oscillator) 6 that feeds a local oscillation signal to the mixer 5; and a PLL (phase-locked loop) 7 that feeds a tuning voltage to the BPFs 2 and 4 and to the VCO 6.

The broadcast signal of the desired channel thus selected by the tuner circuit 10 configured as described above is then, as an intermediate-frequency signal (IF signal), outputted to a demodulator circuit 11 so as to be demodulated. The demodulated signal is then decoded by a decoder circuit 12 into video and audio signals, according to which pictures and sounds are reproduced on a display and from loudspeakers. When the reception apparatus shown in FIG. 8 is applied to an appliance, such as a car-mounted or portable television set or a portable telephone, that conducts communication while moving around, since the apparatus has only one antenna, reception condition greatly varies according to the position and orientation of the antenna 1. When reception condition is poor, it is not possible to reproduce pictures and sounds properly.

Such variation of the reception condition of an antenna can be dealt with by adopting a conventionally known diversity system (see Japanese Patent Application Laid-Open No. H10-84297). The configuration of a reception apparatus that adopts a diversity system is shown in FIG. 9. The reception apparatus shown in FIG. 9 is provided with: antennas 1a and 1b; tuner circuits 10a and 10b that are each configured like the tuner circuit 10 in FIG. 8; demodulator circuits 11a and 11b that demodulate the IF signals fed from the tuner circuits 10a and 10b, respectively; a comparison circuit 13 that compares the signals demodulated by the demodulator circuits 11a and 11b to determine which of the antennas 1a and 1b is yielding better reception condition; and a decoder circuit 12.

In this configuration, the IF signals that are produced from the broadcast signal of the same channel but that are selected separately by the tuner circuits 10a and 10b are demodulated by the demodulator circuits 11a and 11b, and are then fed to the comparison circuit 13. The comparison circuit 13 compares the S/N ratios and bit error rates of the signals fed from the demodulator circuits 11a and 11b, and thereby checks which of the antennas 1a and 1b is yielding better reception condition. Thus, of the demodulated signals, one that is found to be yielding better reception condition by the comparison circuit 13 is selected and is then fed to the decoder circuit 12. In this way, it is possible to reproduce pictures and sounds always from a broadcast signal that is yielding the best reception condition at the moment.

As described above, in the reception apparatus configured as shown in FIG. 9, the tuner circuits 10a and 10b each select the broadcast signal of the same channel and produce separate IF signals; moreover, the demodulator circuits 11a and 11b demodulate identical IF signals. With this configuration, it is indeed possible to select and output the broadcast signal received by an antenna that is yielding the best reception condition at the moment; however, it is not possible to receive and reproduce the broadcast signals of different channels simultaneously. Conventionally, to receive and reproduce the broadcast signals of different channels simultaneously, there is no choice but to provide so many reception apparatuses configured as shown in FIG. 9 as there are channels of which the broadcast signals are to be reproduced simultaneously. Thus, reproducing the broadcast signals of n channels requires n×2 tuners.

SUMMARY OF THE INVENTION

In view of the conventionally encountered inconveniences described above, it is an object of the present invention to provide a reception apparatus that can receive and reproduce the broadcast signals of a plurality of channels and that permits the circuit scale of the tuner circuits provided therein to be reduced.

To achieve the above object, according to the present invention, a reception apparatus is provided with: a plurality of antennas via which to receive broadcast signals including video signals; a plurality of tuners that are connected respectively to the antennas; and a comparator that compares the reception condition of the individual antennas based on signals obtained by being selected by the individual tuners. Here, the plurality of antennas can be used to perform reception operation on the principle of diversity reception. Moreover, when the broadcast signals of a plurality of different channels are received to reproduce pictures of the different channels individually on a plurality of screens, the antenna recognized to be yielding the best reception condition is kept recognized by the comparator, and this antenna and the tuner connected thereto are set to be a particular antenna and a particular tuner so that the broadcast signal of the channel of which the picture is reproduced on, of the plurality of screens, the main screen is received via the particular antenna and the particular tuner.

According to the present invention, it is possible to receive a plurality of channels and to receive the channel to be displayed on the main screen always via the antenna that yields the best reception condition. This makes it possible to display stable pictures on the main screen. Moreover, it is possible to stop the supply of electric power to the tuners that are not performing reception operation and thereby to reduce power consumption. Moreover, it is possible to divide antennas into antenna groups which are used to receive different channels and to perform reception operation by operating each antenna group on the principle of diversity reception. This helps optimize the reception condition of the antenna used to receive the broadcast signal of each channel and thus makes it possible to display stable pictures on each screen.

BRIEF DESCRIPTION OF THE DRAWINGS

FIG. 4 is a block diagram showing the internal configuration of the reception apparatus of a second embodiment of the invention;

FIG. 5 is a diagram showing an example of how four screens are displayed on the display;

DETAILED DESCRIPTION OF PREFERRED EMBODIMENTS

First Embodiment

Figure 1:
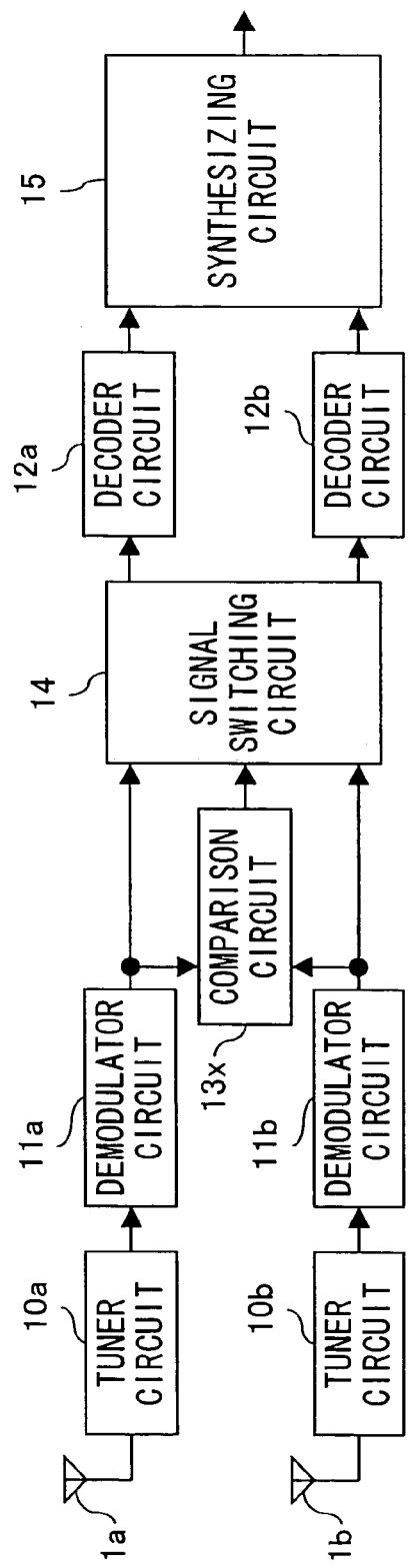
FIG. 1 is a block diagram showing the internal configuration of the reception apparatus of a first embodiment of the invention.
Figure 9:
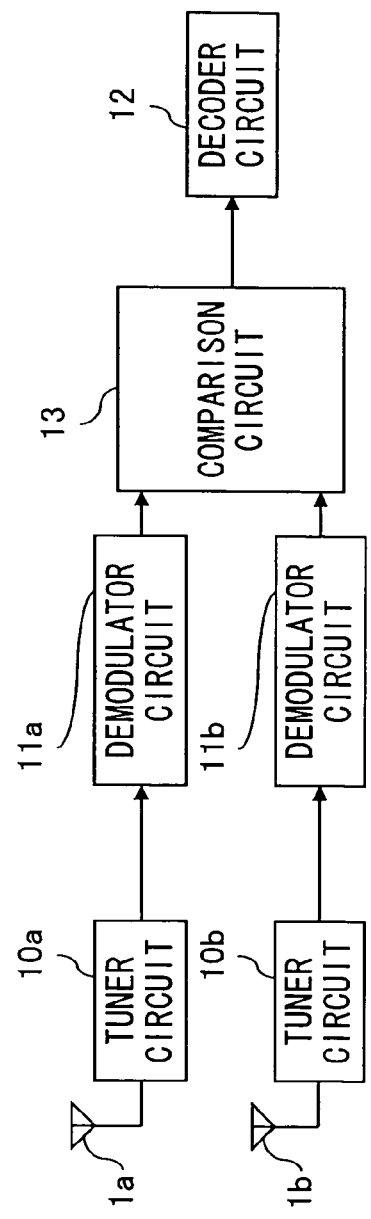
FIG. 9 is a block diagram showing the internal configuration of a conventional reception apparatus.

A first embodiment of the invention will be described below with reference to the drawings. FIG. 1 is a block diagram showing the internal configuration of the reception apparatus of this embodiment. In the reception apparatus shown in FIG. 1, such components as are found also in FIG. 9 are identified with common reference numerals.

Figure 8:
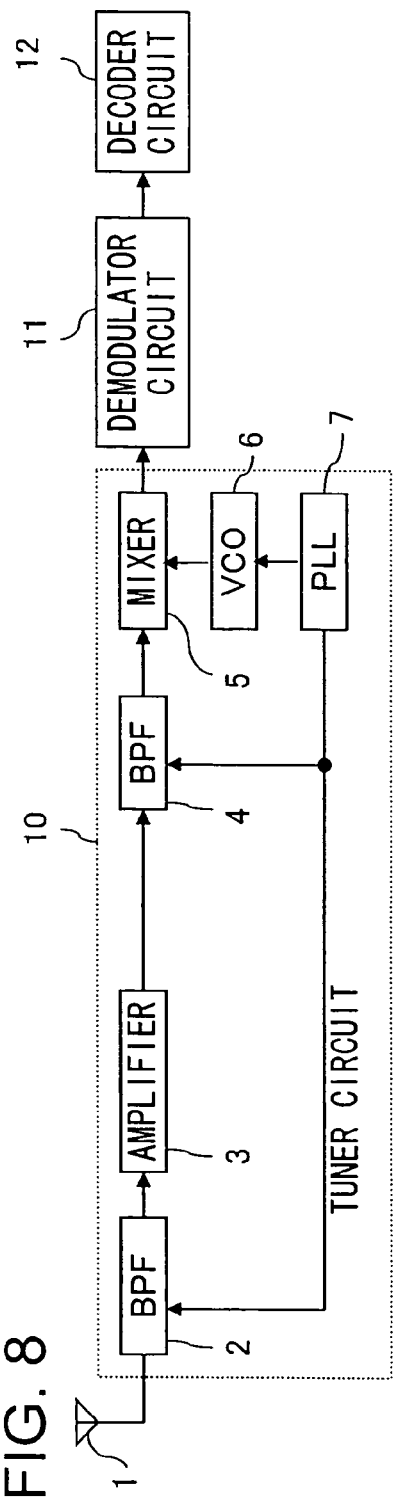
FIG. 8 is a block diagram showing the internal configuration of a conventional reception apparatus.

The reception apparatus shown in FIG. 1 is provided with: antennas 1a and 1b; tuner circuits 10a and 10b; demodulator circuits 11a and 11b; a comparison circuit 13x; a signal switching circuit 14 that switches between the signals from the demodulator circuits 11a and 11b; decoder circuits 12a and 12b that decode the signals fed from the signal switching circuit 14; and a synthesizing circuit 15 that synthesizes together the signals decoded by the decoder circuits 12a and 12b. Here, the tuner circuits 10a and 10b each include, like the tuner circuit 10 in FIG. 8, a BPF 2, an RF amplifier 3, a BPF 4, a mixer 5, a VCO 6, and a PLL 7.

The tuner circuits 10a and 10b each select, from the radio-frequency signals received via the antennas 1a and 1b, respectively, those in a frequency band including a desired channel frequency by the action of the BPF 2, of which the filter coefficients are set by the tuning voltage from the PLL 7. The radio-frequency signals selected by the BPF 2 are then amplified by the RF amplifier 3, and then, from these radio-frequency signals, those in a narrower frequency band including the desired channel frequency are selected by the BPF 4, of which the filter coefficients are set by the tuning voltage from the PLL 7. The radio-frequency signals that have passed through the BPF 4 are fed to the mixer 5, which receives from the VCO 6 a local oscillation signal having the local oscillation frequency set by the tuning voltage from the PLL 7. Consequently, the mixer 5 selects the radio-frequency signal of the desired channel, converts it into an IF signal, and then outputs it.

Diversity Reception Operation

In the reception apparatus configured as described above, when diversity reception is performed as in the reception apparatus shown in FIG. 9, the tuner circuits 10a and 10b receive the broadcast signal of the same channel frequency. That is, between the tuner circuits 10a and 10b, the filter coefficients of the BPFs 2 and 4 are equal, and the tuning voltage from the PLL 7 which determines the local oscillation frequency of the local oscillation signal from the VCO 6 is equal. The comparison circuit 13x checks the S/N ratio and bit error rate of each of the signals demodulated by the demodulator circuits 11a and 11b.

Here, the comparison circuit 13x controls the signal switching circuit 14 in such a way that the signal from whichever of the demodulator circuits is recognized to be outputting a signal with less noise or with a lower bit error rate by the comparison circuit 13x is fed to the decoder circuit 12a. Specifically, if the signal from the demodulator circuit 11a has less noise or a lower bit error rate, the signal switching circuit 14 feeds the signal from the demodulator circuit 11a to the decoder circuit 12a; if the signal from the demodulator circuit 11b has less noise or a lower bit error rate, the signal switching circuit 14 feeds the signal from the demodulator circuit 11b to the decoder circuit 12a.

As a result of the comparison circuit 13x and the signal switching circuit 14 operating so as to switch the interconnection between the demodulator circuits 11a and 11b and the decoder circuit 12a as described above, the decoder circuit 12a is always fed with the signal received by whichever of the antennas 1a and 1b is yielding better reception condition, i.e., the signal with less noise or a lower bit error rate. The decoder circuit 12a then decodes the signal fed thereto to retrieve video and audio signals, which are then fed through the synthesizing circuit 15 to a display and loudspeakers (of which none is illustrated) so that pictures and sounds are reproduced and outputted. All this while, the operation of the decoder circuit 12b is kept halted.

Multiple-Screen Display Reception Operation

The reception apparatus under discussion is provided with a multiple-screen display function. When this function is in operation, within the screen 50 of the display, a window for displaying another screen is displayed so that the pictures of different channels can be reproduced and displayed on a main screen, i.e., the entire screen 50 of the display, and a sub screen, i.e., the window 51 displayed within the screen 50. When this multiple-screen display function is used, the picture reproduced from the video signal decoded by the decoder circuit 12a is displayed on the main screen, and the picture reproduced from the video signal decoded by the decoder circuit 12b is displayed on the sub screen. In addition, only the sound reproduced from the audio signal decoded by the decoder circuit 12a is reproduced. Now, the operations performed when the user starts the multiple-screen display function will be described with reference to the flow chart shown in FIG. 3.

When the starting of multiple-screen display is requested, the comparison circuit 13x checks the noise and bit error rates of the signals from the demodulator circuits 11a and 11b to check which of the signals has less noise or a lower bit rates and thereby to check which of the antennas 1a and 1b is yielding better reception condition (STEP1). The signal switching circuit 14 then feeds the signal from whichever of the demodulator circuits is outputting the signal obtained from the antenna that is yielding better reception condition to the decoder circuit 12a, and feeds the signal from the demodulator circuit that is outputting the signal obtained from the other antenna to the decoder circuit 12b (STEP2). Here, the channel frequency selected by the tuner circuit connected to the antenna that is yielding better reception condition is set to be the channel frequency of the channel that is desired to be displayed on the main screen, and the channel frequency selected by the tuner circuit that is connected to the other antenna is set to be the channel frequency of the channel that is desired to be displayed on the sub screen.

It should be noted that, in the following descriptions, the antenna via which the broadcast signal of the channel to be displayed on the main screen is referred to as the "main antenna," the antenna via which the broadcast signal of the channel to be displayed on the sub screen is referred to as the "sub antenna," the tuner circuit and demodulator circuit that process the broadcast signal received via the main antenna are referred to as the "main tuner circuit and "main demodulator circuit," and the tuner circuit and demodulator circuit that process the broadcast signal received via the sub antenna are referred to as the "sub tuner circuit and "sub demodulator circuit."

Specifically, if, in STEP1, the antenna 1a is found to be yielding better reception condition, then, in STEP2, the demodulator circuit 11a is connected to the decoder circuit 12a, and the demodulator circuit 11b is connected to the decoder circuit 12b. Here, the channel frequency of the tuner circuit 10a is set to be the channel frequency of the channel that is desired to be displayed on the main screen, and the channel frequency of the tuner circuit 10b is set to be the channel frequency of the channel that is desired to be displayed on the sub screen. By contrast, if, in STEP1, the antenna 1b is found to be yielding better reception condition, then, in STEP2, the demodulator circuit 11b is connected to the decoder circuit 12a, and the demodulator circuit 11a is connected to the decoder circuit 12b. Here, the channel frequency of the tuner circuit 10b is set to be the channel frequency of the channel that is desired to be displayed on the main screen, and the channel frequency of the tuner circuit 10a is set to be the channel frequency of the channel that is desired to be displayed on the sub screen.

As a result of the switching operation by the signal switching circuit 14 as described above, the video and audio signals obtained through the decoding by the decoder circuit 12a and the video and audio signals obtained through the decoding by the decoder circuit 12b are fed to the synthesizing circuit 15. The synthesizing circuit 15 then synthesizes the video signals in such a way that the picture represented by the video signal from the decoder circuit 12a is displayed on the main screen and the picture represented by the video signal from the decoder circuit 12b is displayed on the sub screen, and synthesizes the audio signals in such a way that only the sound represented by the audio signal from the decoder circuit 12a is outputted.

Subsequently, whether or not the ending of multiple-screen display is requested is checked (STEP3). If the ending of multiple-screen display is not requested (No), the comparison circuit 13x checks whether or not the noise or bit error rate of the signal from the main demodulator circuit is equal to or less than a predetermined value (STEP4). That is, in STEP4, whether or not the main antenna is yielding reception condition better than predetermined reception condition is checked. Accordingly, while the signal from the demodulator circuit 11a is being fed to the decoder circuit 12a to reproduce the picture on the main screen, in STEP4, whether or not the noise or bit error rate in the signal from the demodulator circuit 11a is equal to or less than the predetermined value is checked, and thereby whether or not the reception condition with the antenna 1a has deteriorated is checked. On the other hand, while the signal from the demodulator circuit 11b is being fed to the decoder circuit 12a to reproduce the picture on the main screen, in STEP4, whether or not the noise or bit error rate in the signal from the demodulator circuit 11b is equal to or less than the predetermined value is checked, and thereby whether or not the reception condition with the antenna 1b has deteriorated is checked.

If, in STEP4, the noise or bit error rate in the signal from the main demodulator circuit is found to be more than the predetermined value (No), then whether or not the noise or bit error rate in the signal from the main demodulator circuit is equal to or less than the noise or bit error rate in the signal from the sub demodulator circuit is checked (STEP5). That is, in STEP5, whether or not the main antenna is yielding reception condition better than the sub antenna is checked. Accordingly, while the signal from the demodulator circuit 11a is being fed to the decoder circuit 12a to reproduce the picture on the main screen, in STEP5, whether or not the noise or bit error rate in the signal from the demodulator circuit 11a is equal to or less than the noise or bit error rate in the signal from the demodulator circuit 11b is checked, and thereby whether or not the reception condition with the antenna 1a has become poorer than the reception condition with the antenna 1b is checked. On the other hand, while the signal from the demodulator circuit 11b is being fed to the decoder circuit 12a to reproduce the picture on the main screen, in STEP5, whether or not the noise or bit error rate in the signal from the demodulator circuit 11b is equal to or less than the noise or bit error rate in the signal from the demodulator circuit 11a is checked, and thereby whether or not the reception condition with the antenna 1b has become poorer than the reception condition with the antenna 1a is checked.

If, in STEP5, the noise or bit error rate in the signal from the main demodulator circuit is found to be more than the noise or bit error rate in the signal from the sub demodulator circuit (No), the signal switching circuit 14 switches the interconnection between the demodulator circuits 11a and 11b and the decoder circuits 12a and 12b (STEP6). Accordingly, while the signal from the demodulator circuit 11a is being fed to the decoder circuit 12a to reproduce the picture on the main screen, in STEP6, the signal switching circuit 14 performs switching operation in such a way that now the signal from the demodulator circuit 11a is fed to the decoder circuit 12b and the signal from the demodulator circuit 11b is fed to the decoder circuit 12a. On the other hand, while the signal from the demodulator circuit 11b is being fed to the decoder circuit 12a to reproduce the picture on the main screen, in STEP6, the signal switching circuit 14 performs switching operation in such a way that now the signal from the demodulator circuit 11a is fed to the decoder circuit 12a and the signal from the demodulator circuit 11b is fed to the decoder circuit 12b.

If, in STEP4, the noise or bit error rate in the signal from the main demodulator circuit is found to be equal to or less than the predetermined value and thus the main antenna is found to be yielding good reception condition (Yes), or if, in STEP5, the noise or bit error rate in the signal from the main demodulator circuit is found to be equal to or less than the noise or bit error rate in the signal from the sub demodulator circuit and thus the main antenna is found to be yielding reception condition better than the sub antenna, or when, in STEP6, the signal switching circuit 14 performs switching operation, the operation flow then proceeds to STEP3.

If the ending of multiple-screen display is requested (Yes), then whether or not the ending of the operation of the reception apparatus is requested is checked (STEP7). If the ending of the operation of the reception apparatus is not requested (No), the window 51, in which the sub screen is displayed, is closed so that only the picture on the main screen remains displayed (STEP8). That is, now, with the operation of the decoder circuit 12b halted, the diversity reception operation described earlier is performed by using the antennas 1a and 1b, tuner circuits 10a and 10b, and demodulator circuits 11a and 11b. Thus, only the picture and sound obtained through the decoding by the decoder circuit 12a are reproduced and outputted. If, in STEP7, the ending of the operation of the reception apparatus is requested (Yes), the operation of the reception apparatus is ended (STEP9).

Through these operations, it is possible to always select, as the signal to be reproduced on the main screen, the signal received via whichever of the antennas is yielding better reception condition. In this way, it is possible to always reproduce the picture displayed on the main screen in good condition.

This embodiment deals with a case where there are provided two antennas, two tuner circuits, two demodulator circuits, and two decoder circuits. Needless to say, there may be provided more than two of each of those circuits. In such a case, more than two screens may be displayed. Through a flow of operations similar to that shown in FIG. 3, the video signal decoded from the signal obtained from whichever antenna is yielding the best reception condition is reproduced on the screen that serves as the main screen. The main and sub screens may both be realized by dividing the screen of a single display.

Second Embodiment

A second embodiment of the invention will be described below with reference to the drawings. FIG. 4 is a block diagram showing the internal configuration of the reception apparatus of this embodiment. In the reception apparatus shown in FIG. 4, such components as are found also in FIG. 1 are identified with common reference numerals.

The reception apparatus shown in FIG. 4 is provided with: antennas 1a to 1d; tuner circuits 10a to 10d that are connected to the antenna 1a to 1d, respectively; demodulator circuits 11a to 11d that receive signals from the tuner circuits 10a to 10d, respectively; a comparison circuit 13y that compares the S/N ratios and bit error rates of the signals from the demodulator circuits 11a to 11d; a signal switching circuit 14 that switches between the signals from the demodulator circuits 11a to 11d; decoder circuits 12a to 12d that decode the signals fed from the signal switching circuit 14; and a synthesizing circuit 15 that synthesizes together the signals decoded by the decoder circuits 12a to 12d. Here, the tuner circuits 10a to 10d each include, like the tuner circuit 10 in FIG. 8, a BPF 2, an RF amplifier 3, a BPF 4, a mixer 5, a VCO 6, and a PLL 7.

Diversity Reception Operation

In the reception apparatus configured as described above, when diversity reception is performed, as in the reception apparatus shown in FIG. 1, the tuner circuits 10a to 10d receive the broadcast signal of the same channel frequency. All the while, the decoder circuits 12b to 12d are kept off. The comparison circuit 13y checks the S/N ratio and bit error rate of each of the signals demodulated by the demodulator circuits 11a to 11d. The comparison circuit 13y controls the signal switching circuit 14 in such a way that the signal from whichever of the demodulator circuits is recognized to be outputting a signal with the least noise or lowest bit error rate by the comparison circuit 13 is fed to the decoder circuit 12a.

Specifically, if the signal from the demodulator circuit 11a has the least noise or lowest bit error rate, the signal switching circuit 14 feeds the signal from the demodulator circuit 11a to the decoder circuit 12a; if the signal from the demodulator circuit 11b has the least noise or lowest bit error rate, the signal switching circuit 14 feeds the signal from the demodulator circuit 11b to the decoder circuit 12a; if the signal from the demodulator circuit 11c has the least noise or lowest bit error rate, the signal switching circuit 14 feeds the signal from the demodulator circuit 11c to the decoder circuit 12a; and, if the signal from the demodulator circuit 11d has the least noise or lowest bit error rate, the signal switching circuit 14 feeds the signal from the demodulator circuit 11d to the decoder circuit 12a. As a result of the comparison circuit 13y and the signal switching circuit 14 operating so as to switch the interconnection between the demodulator circuits 11a to 11d and the decoder circuit 12a as described above, the decoder circuit 12a is always fed with the signal received by whichever of the antennas 1a to 1d is yielding the best reception condition, i.e., the signal with the least noise or lowest bit error rate.

Multiple-Screen Display Reception Operation

1. Four-Screen Display

A description will be given below of a four-screen display function. With this function, three sub screens 51a to 51c are generated so that the pictures of different channels can be reproduced on four screens including the screen 50. To achieve this, first, based on the signals from the demodulator circuits 11a to 11d, the comparison circuit 13y checks the reception condition of the antennas 1a to 1d, and the signal switching circuit 14 feeds the signal obtained from whichever of the antennas is yielding the best reception condition to the decoder circuit 12a. Moreover, the signal switching circuit 14 feeds the signals obtained from the other three antennas, i.e., those yielding the second-best, third-best, and poorest reception condition, to the decoder circuits 12b, 12c, and 12d, respectively.

Subsequently, the synthesizing circuit 15 synthesizes together the video signals fed from the decoder circuits 12a to 12d, and selects the audio signal fed from the decoder circuit 12a. The resulting video and audio signals are fed to a display and loudspeakers (of which none is illustrated) so that pictures are displayed on the main and three sub screens and sounds are outputted. Here, of the tuner circuits 10a to 10d, the one that is connected to the antenna via which the signal to be fed to the decoder circuit 12a is received performs tuning operation for the channel frequency of the channel to be displayed on the main screen. The other three tuner circuits perform tuning operation for the channel frequencies of the channels to be displayed on the sub screens allocated to the decoder circuits 12b to 12d to which those tuner circuits respectively feed signals.

While these operations are being performed, as in the first embodiment, the comparison circuit 13y checks whether or not the reception condition with the antenna (main antenna) via which the signal fed to the decoder circuit 12a is being received has become poorer than a predetermined value. That is, whether or not the noise or bit error rate in the signal from the demodulator circuit (main demodulator circuit) that processes the broadcast signal received via the main antenna has deteriorated is checked. Here, if the reception condition with the main antenna is found to have become poorer than the predetermined value, then, based on the noise and bit error rates in the signals fed from the demodulator circuits 11a to 11d, the comparison circuit 13y recognizes whichever of the antennas 1a to 1d is yielding the best reception condition.

Now that an antenna other than the current main antenna is recognized to be yielding the best reception condition, the channel frequency selected by the tuner circuit (main tuner circuit) currently connected to the main antenna is switched to the channel frequency selected by the tuner circuit connected to the newly recognized antenna. Moreover, the channel frequency selected by the tuner circuit connected to the antenna that is currently yielding the best reception condition is switched to the channel frequency of the channel displayed on the main screen so that this tuner circuit is set to be the new main tuner circuit. Furthermore, the signal switching circuit 14 connects the demodulator circuit that outputs the signal received via the antenna that is yielding the best reception condition to the decoder circuit 12a so that this demodulator circuit is set to be the new main demodulator circuit, and the decoder circuit that has up till now been connected to this demodulator circuit is connected to the original main demodulator circuit.

Specifically, suppose now that the signal from the demodulator circuit 11a is being fed to the decoder circuit 12a so that the picture of the channel Ca selected by the tuner circuit 10a is reproduced on the main screen, and that the signals from the demodulator circuits 11b to 11d are being fed to the decoder circuits 12b to 12d, respectively, so that the pictures of the channels Cb to Cd selected by the tuner circuits 10b to 10d are reproduced on the three sub screens, respectively. When, from this state, the reception condition with the antenna 1a so deteriorates that the reception condition with the antenna 1b becomes the best, the tuner circuits 10a and 10b switch the channel frequencies in such a way that the tuner circuit 10a selects the broadcast signal of the channel Cb and the tuner circuit 10b selects the broadcast signal of the channel Ca. Moreover, the signal switching circuit 14 feeds the signal from the demodulator circuit 11b to the decoder circuit 12a, and feeds the signal from the demodulator circuit 11a to the decoder circuit 12b.

Through these operations, it is possible to select the channel of the picture to be displayed on the main screen by using whichever of the antennas 1a to 1d is yielding the best reception condition and the tuner corresponding to that antenna. This makes it possible to reproduce the picture displayed on the main screen always based on the video signal obtained from the broadcast signal received in good reception condition, and thereby obtain a stable picture.

2. First Example of Dual-Screen Display

Figure 2:
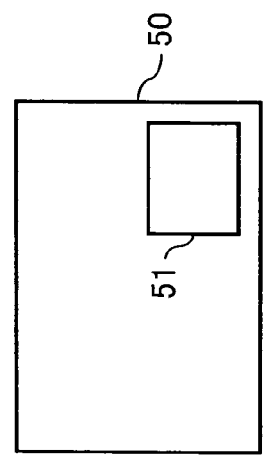
FIG. 2 is a diagram showing an example of how two screens are displayed on the display.

A description will be given below of an example of a dual-screen display function. With this function, as in the first embodiment, pictures can be displayed on two screens, specifically the main screen, i.e., the entire screen 50 of the display, and the sub screen, i.e., a window 51 within the screen 50, as shown in FIG. 2. In this example, of the tuner circuits 10a to 10d, those connected to the antennas yielding the poorest and second-poorest reception condition are kept off, and, of the demodulator circuits 11a to 11d, those connected to the antennas yielding the poorest and second-poorest reception condition are kept off. Specifically, when the antenna 1a and 1c are yielding good reception condition, with the antenna 1a yielding the best reception condition, the tuner circuits 10b and 10d and the demodulator circuits 11b and 11d are kept off. Moreover, the decoder circuits 12c and 12d, too, are kept off.

The signal switching circuit 14 then feeds the signal obtained from the tuner circuit 10a and demodulator circuit 11a connected to the antenna 1a, which is yielding the best reception condition, to the decoder circuit 12a, and feeds the signal obtained from the tuner circuit 10c and demodulator circuit 11c connected to the antenna 1c to the decoder circuit 12b. Here, the tuner circuit 10a selects the signal of the channel to be displayed on the main screen, and the tuner circuit 10c selects the signal of the channel to be displayed on the sub screen.

Figure 3:
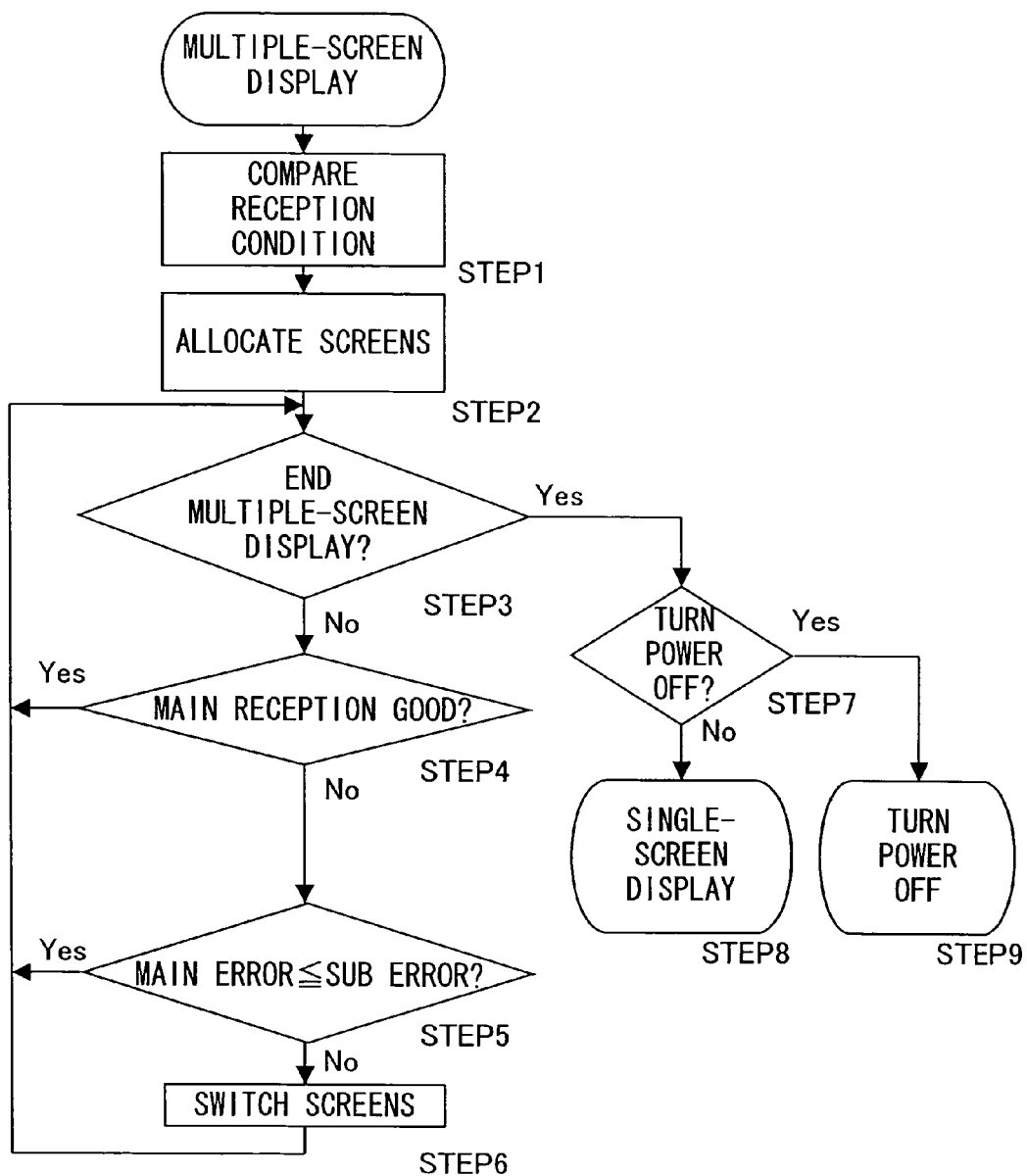
FIG. 3 is a flow chart showing the operations performed to achieve multiple-screen display in the reception apparatus of the first embodiment.

When dual-screen display is performed with two of the tuner circuits 10a to 10d selected and two of the demodulator circuits 11a to 11d selected as described above, the necessary operations are performed according to the flow chart shown in FIG. 3 as in the first embodiment. Specifically, when the antennas 1a and 1c are yielding good reception condition as in the example described above, the tuner circuits 10a and 10c and demodulation circuit 11a and 11c operate in the same manner as the tuner circuits 10a and 10b and demodulation circuit 11a and 11b in the first embodiment. Thus, the channel displayed on the main screen is selected by the tuner circuit that is connected to whichever of the antennas is yielding good reception condition, it is possible to reproduce, on the main screen, the picture to be displayed on the main screen always based on the video signal obtained from the broadcast signal received in good reception condition, and thereby obtain a stable picture.

3. Second Example of Dual-Screen Display

A description will be given below of another example of a dual-screen display function. With this function, too, pictures can be displayed on two screens, specifically the main screen, i.e., the entire screen 50 of the display, and the sub screen, i.e., a window 51 within the screen 50, as shown in FIG. 2. In this example, as opposed to the first example described above, all the tuner circuits 10a to 10d are kept in operation, and all the demodulator circuits 11a to 11d are kept operating; the signal obtained from the tuner circuit and demodulator circuit that are connected to, of the four antennas 1a to 1d, the one yielding the best reception condition is fed to the decoder circuit 12a, and the signal obtained from the tuner circuit and demodulator circuit that are connected to the antenna yielding the second-best reception condition is fed to the decoder circuit 12b. The decoder circuits 12c and 12d are kept off.

Figure 6:
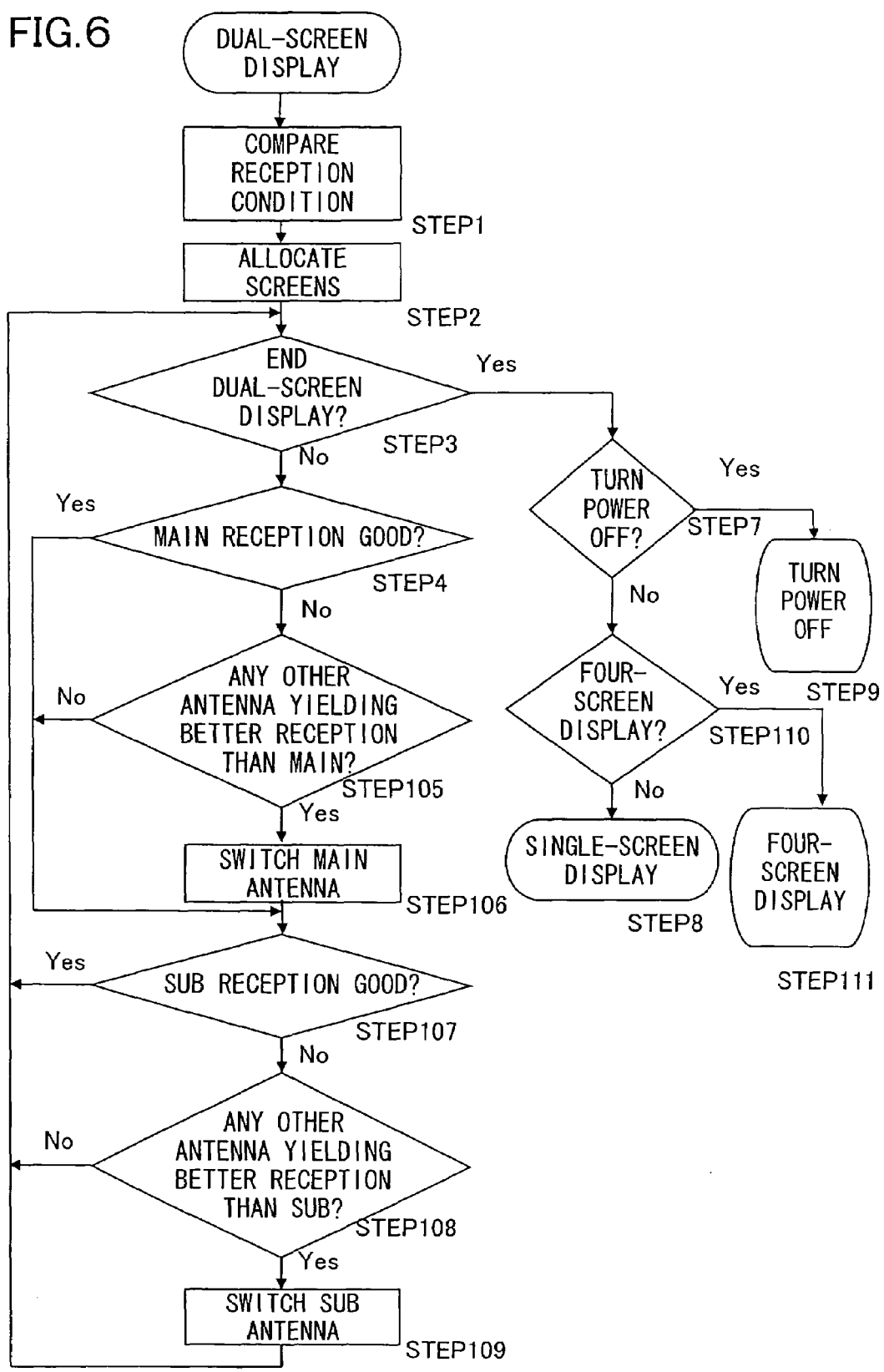
FIG. 6 is a flow chart showing the operations performed to achieve dual-screen display in the reception apparatus of the second embodiment.

Now, the operations performed in this example will be described with reference to the flow chart shown in FIG. 6. In the flow chart shown in FIG. 6, such operation steps as are found also in the flow chart shown in FIG. 3 are identified with common reference numerals, and their detailed explanations will not be repeated.

When the starting of multiple-screen display is requested, the comparison circuit 13y compares the reception condition of the antennas 1a to 1d (STEP1). Then, the signal obtained from the tuner circuit (main tuner circuit) and demodulator circuit (main demodulator circuit) that are connected to the antenna (main antenna) that is yielding the best reception condition is fed to the decoder circuit 12a, and the signal obtained from the tuner circuit (sub tuner circuit) and demodulator circuit (sub demodulator circuit) that are connected to the antenna (sub antenna) that is yielding the second-best reception condition is fed to the decoder circuit 12b (STEP2).

Thus, if the antenna 1a is yielding the best reception condition and the antenna 1c is yielding the second-best reception condition, the signal from the demodulator circuit 11a is fed to the decoder circuit 12a, and the signal from the demodulator circuit 11c is fed to the decoder circuit 12b. Here, the two tuner circuits other than the main and sub tuner circuits perform tuning operation for the same channel frequency for which the main tuner circuit does. Moreover, the tuner circuit 10*a* selects the broadcast signal of the channel for the main screen, and the tuner circuit 10*c* selects the broadcast signal of the channel for the sub screen. Subsequently, whether or not the ending of dual-screen display is requested is checked (STEP3).

If the ending of dual-screen display is not requested (No), whether or not the signal from the main demodulator circuit has noise or a bit error rate equal to or less than a predetermined value is checked (STEP4). That is, whether or not the main antenna is yielding good reception condition is checked. Here, if the signal from the main demodulator circuit has noise or a bit error rate more than the predetermined value (No), the comparison circuit 13*y* checks whether or not, of the three demodulator circuits other than the main demodulator circuit, any is outputting a signal with less noise or a lower bit error rate than the signal from the main demodulator circuit (STEP105). That is, whether or not, of the three antennas other than the main antenna, any is yielding reception condition better than the main antenna is checked.

If any other antenna or antennas are found to be yielding better reception condition than it (Yes), whichever of them is yielding the best reception condition is set to be the main antenna (STEP106). Here, the tuner circuit that is connected to the antenna that has newly been set to be the main antenna is set to be the main tuner circuit to perform tuning operation for the channel for the main screen, and the signal switching circuit 14 connects the demodulator circuit that is connected to the newly set main tuner circuit to the decoder circuit 12*a*. On the other hand, the tuner circuit that has been the main tuner circuit up till the switching now performs tuning operation for the channel that has been received up till the switching by the tuner circuit that is now the main tuner circuit, and the demodulator circuit that has been the main demodulator circuit up till the switching is now connected to the decoder circuit that has been connected up till the switching to the demodulator circuit that is now the main demodulator circuit.

Accordingly, in a case where, as described above, the antenna 1*a* is the main antenna and the antenna 1*c* is the sub antenna, if, in STEP4, the reception condition with the antenna 1*a* is recognized to have deteriorated, then, in STEP105, the reception condition with the antenna 1*a* is compared with that with the antennas 1*b* to 1*d*. If the reception condition with the antenna 1*b* is the best among the antennas 1*a* to 1*d*, the antenna 1*b* is now set to be the main antenna, and the demodulator circuit 11*b* is connected to the decoder circuit 12*a*. Here, since the tuner circuits 10*a* and 10*b* perform tuning operation for the same channel frequency, the channel frequencies selected by the tuner circuits 10*a* and 10*b* are not switched.

By contrast, if the reception condition with the antenna 1*c* is the best among the antennas 1*a* to 1*d*, the antenna 1*c* is now set to be the main antenna, the demodulator circuit 11*c* is connected to the decoder circuit 12*a*, and the demodulator circuit 11*a* is connected to the decoder circuit 12*b*. Here, since the tuner circuits 10*a* and 10*c* perform tuning operation for different channel frequencies, the channel frequencies selected by the tuner circuits 10*a* and 10*c* are switched. Thus, the antenna 1*a* is now set to be the sub antenna.

In the course of these operations, if, in STEP4, the main antenna is found to be yielding good reception condition (Yes), or if, in STEP105, no other antenna is found to be yielding better reception condition than the main antenna (No), or when, in STEP106, the switching is performed, then whether or not the signal from the sub demodulator circuit has noise or a bit error rate equal to or less than a predetermined value is checked (STEP107). That is, whether or not the sub antenna is yielding good reception condition is checked. Here, if the signal from the sub demodulator circuit has noise or a bit error rate more than the predetermined value (No), the comparison circuit 13*y* checks whether or not, of the two demodulator circuits other than the main and sub demodulator circuits, any is outputting a signal with less noise or a lower bit error rate than the signal from the sub demodulator circuit (STEP108).

If any other antenna or antennas are found to be yielding better reception condition than the sub antenna (Yes), whichever of them is yielding the best reception condition is set to be the sub antenna (STEP109). Here, the tuner circuit that is connected to the antenna that has newly been set to be the sub antenna is set to be the sub tuner circuit to perform tuning operation for the channel for the sub screen, and the signal switching circuit 14 connects the demodulator circuit that is connected to the newly set sub tuner circuit to the decoder circuit 12*b*. On the other hand, the tuner circuit that has been the sub tuner circuit up till the switching now performs tuning operation for the same channel frequency for which the main tuner circuit does.

Accordingly, in a case where, as described above, the antenna 1*a* is the main antenna and the antenna 1*c* is the sub antenna, if, in STEP107, the reception condition with the antenna 1*c* is recognized to have deteriorated, then, in STEP108, the reception condition with the antenna 1*c* is compared with that with the antennas 1*b* and 1*d*. If the reception condition with the antenna 1*b* is the best among the antennas 1*b* to 1*d*, the antenna 1*b* is now set to be the sub antenna, and the demodulator circuit 11*b* is connected to the decoder circuit 12*b*. Here, the channel frequencies selected by the tuner circuits 10*b* and 10*c* are switched.

In the course of these operations, if, in STEP107, the sub antenna is found to be yielding good reception condition (Yes), or if, in STEP108, no other antenna is found to be yielding better reception condition than the sub antenna (No), or when, in STEP109, the switching is performed, then the operation flow proceeds to STEP3. In STEP3, if the ending of dual-screen display is requested (Yes), then whether or not the ending of the operation of the reception apparatus is requested is checked (STEP7). If the ending of the operation of the reception apparatus is not requested (No), then whether or not the starting of four-screen display is requested is checked (STEP110); if the ending of the operation of the reception apparatus is requested (Yes), then the operation of the reception apparatus is ended (STEP9).

If, in STEP 110, the starting of four-screen display is requested (Yes), the decoder circuits 12*c* and 12*d* are turned on, and the four-screen display described earlier is performed (STEP111). By contrast, if in STEP110, the starting of four-screen display is not requested (No), the window 51, in which the sub screen is displayed, is closed so that only the picture on the main screen remains displayed (STEP8). That is, now, with the operation of the decoder circuit 12*b* halted, the diversity reception operation described earlier is performed by using the antennas 1*a* to 1*d*, tuner circuits 10*a* to 10*d*, and demodulator circuits 11*a* to 11*d*.

As described above, through the flow of operations of the second example, it is possible to reproduce on the main screen the video signal obtained from whichever of the four antennas is yielding the best reception condition. In this way, it is possible to always reproduce the picture displayed on the main screen in good condition. On the other hand, through the flow of operations of the first example, it is possible to keep two tuner circuits and two demodulator circuits off, and thereby to reduce power consumption.

The first and second embodiments deal with cases where there are provided two or four antennas, two or four tuner circuits, two or four demodulator circuits, and two or four decoder circuits. Needless to say, there may be provided any number other than two or four of each of those circuits. In such cases, any number other than two or four of screens may be displayed. Through a flow of operations similar to that shown in FIG. 3 or 6, the video signal decoded from the signal obtained from whichever antenna is yielding the best reception condition is reproduced on the screen that serves as the main screen.

Third Embodiment

Figure 7:
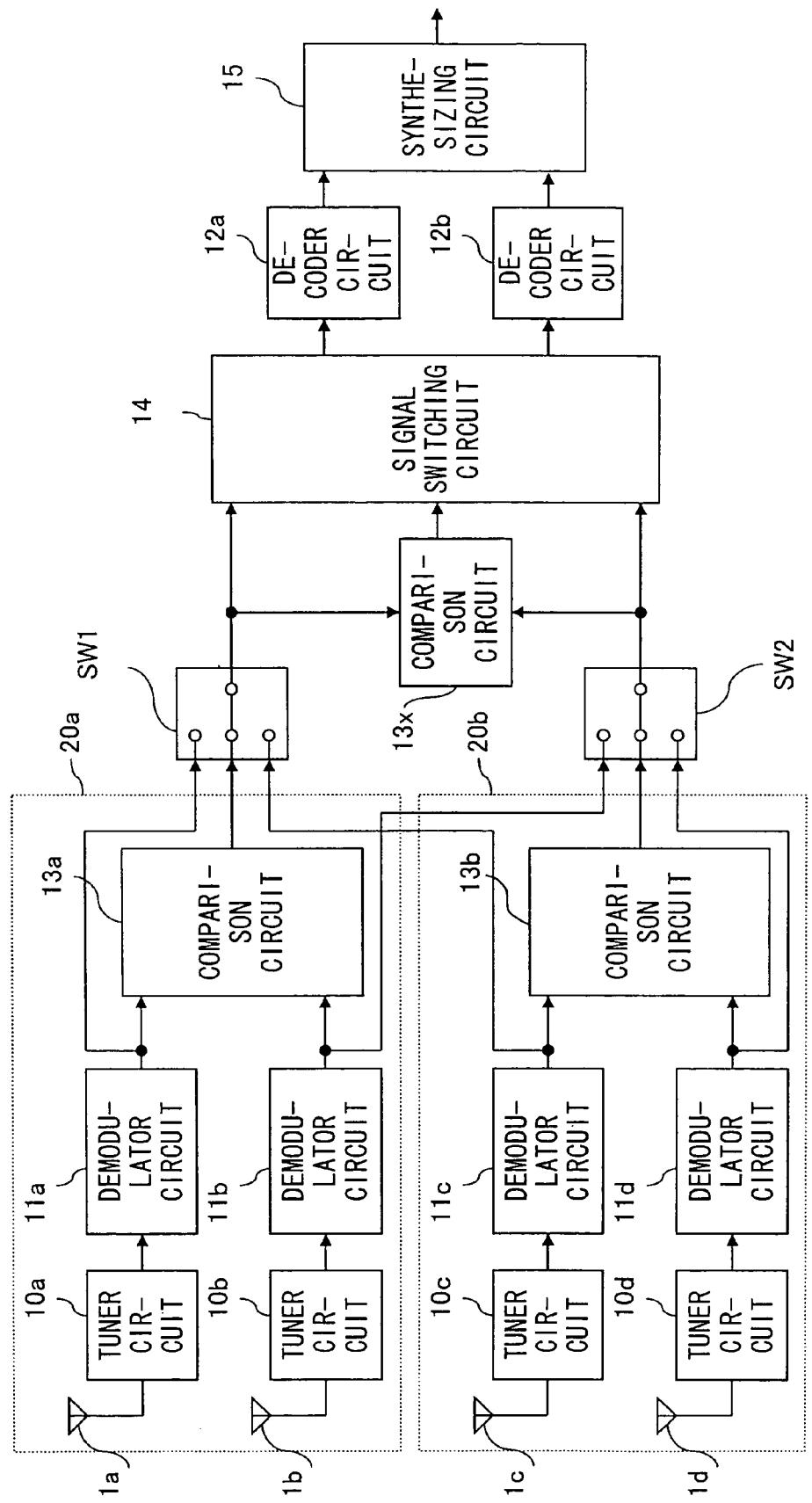
FIG. 7 is a block diagram showing the internal configuration of the reception apparatus of a third embodiment of the invention.

A third embodiment of the invention will be described below with reference to the drawings. FIG. 7 is a block diagram showing the internal configuration of the reception apparatus of this embodiment. In the reception apparatus shown in FIG. 7, such components as are found also in FIGS. 1 and 4 are identified with common reference numerals.

The reception apparatus shown in FIG. 7 is provided with: antennas 1a to 1d; tuner circuits 10a to 10d; demodulator circuits 11a to 11d; a comparison circuit 13a that compares the S/N ratios and bit error rates of the signals from the demodulator circuits 11a and 11b; a comparison circuit 13b that compares the S/N ratios and bit error rates of the signals from the demodulator circuits 11c and 11d; a switch SW1 that selects one of the signals from the comparison circuit 13a and the demodulator circuits 11a and 11c; a switch SW2 that selects one of the signals from the comparison circuit 13b and the demodulator circuits 11b and 11d; a comparison circuit 13x that compares the S/N ratios and bit error rates of the signals from the switches SW1 and SW2; a signal switching circuit 14 that switches between the signals from the switches SW1 and SW2; decoder circuits 12a and 12b that decode the signals fed from the signal switching circuit 14; and a synthesizing circuit 15 that synthesizes together the signals decoded by the decoder circuits 12a and 12b. Here, the tuner circuits 10a to 10d each include, like the tuner circuit 10 in FIG. 8, a BPF 2, an RF amplifier 3, a BPF 4, a mixer 5, a VCO 6, and a PLL 7.

In the reception apparatus configured as described above, the antennas 1a and 1b, tuner circuits 10a and 10b, demodulator circuits 11a and 11b, and comparison circuit 13a together form a pair tuner circuit 20a that performs diversity reception by using the two antennas 1a and 1b; the antennas 1c and 1d, tuner circuits 10c and 10d, demodulator circuits 11c and 11d, and comparison circuit 13b together form a pair tuner circuit 20b that performs diversity reception by using the two antennas 1c and 1d. In this configuration, the spatial distance between the antennas 1a and 1b and the spatial distance between the antennas 1c and 1d are both greater than any other spatial distance between the antennas 1a to 1d. That is, either the spatial distance between the antennas 1a and 1b or the spatial distance between the antennas 1c and 1d is the greatest among all the spatial distances between the antennas 1a to 1d.

The reception apparatus shown in FIG. 5 can perform reception operation on the principle of diversity reception by using the four antennas 1a to 1d. In addition, this reception apparatus is provided with a multiple-screen display function whereby, as in the first embodiment, pictures can be displayed on two screens, for example the main screen, i.e., the entire screen 50 of the display, and the sub screen, i.e., a window 51 within the screen 50, as shown in FIG. 2. Furthermore, when this multiple-screen display function is used, multiple-screen display can be performed either by using all the antennas 1a to 1d or by using only two of the antennas 1a to 1d.

Diversity Reception Operation

In the reception apparatus configured as described above, when diversity reception is performed, as in the reception apparatus shown in FIG. 1, the tuner circuits 10a to 10d receive the broadcast signal of the same channel frequency. Here, the switch SW1 connects the comparison circuit 13a to the comparison circuit 13x and the signal switching circuit 14, and the switch SW2 connects the comparison circuit 13b to the comparison circuit 13x and the signal switching circuit 14. Then, the comparison circuit 13a checks the S/N ratio and bit error rate of each of the signals demodulated by the demodulator circuits 11a and 11b, and the comparison circuit 13b checks the S/N ratio and bit error rate of each of the signals demodulated by the demodulator circuits 11c and 11d.

Here, the signals from whichever of the demodulator circuits are recognized to be outputting signals with less noise or a lower bit error rate by the comparison circuits 13a and 13b are fed to the switches SW1 and SW2, respectively. Specifically, with respect to the comparison circuit 13a, if the signal from the demodulator circuit 11a has less noise or a lower bit error rate, the comparison circuit 13a feeds this signal to the switch SW1; by contrast, if the signal from the demodulator circuit 11b has less noise or a lower bit error rate, the comparison circuit 13a feeds this signal to the switch SW1. On the other hand, with respect to the comparison circuit 13b, if the signal from the demodulator circuit 11c has less noise or a lower bit error rate, the comparison circuit 13b feeds this signal to the switch SW2; by contrast, if the signal from the demodulator circuit 11d has less noise or a lower bit error rate, the comparison circuit 13b feeds this signal to the switch SW2.

The signals selected by the comparison circuits 13a and 13b are then fed via the switches SW1 and SW2 to the comparison circuit 13x and the signal switching circuit 14. The comparison circuit 13x then checks the S/N ratio and bit error rate of each of the signals selected by the comparison circuits 13a and 13b. Here, the comparison circuit 13x controls the signal switching circuit 14 in such a way that the signal from whichever of the comparison circuits is recognized to be outputting a signal with less noise or a lower bit error rate by the comparison circuit 13x is fed to the decoder circuit 12. Specifically, if the signal from the comparison circuit 13a has less noise or a lower bit error rate, the signal switching circuit 14 feeds the signal from the comparison circuit 13a to the decoder circuit 12a; if the signal from the comparison circuit 13b has less noise or a lower bit error rate, the signal switching circuit 14 feeds the signal from the comparison circuit 13b to the decoder circuit 12a.

As a result of the comparison circuits 13a, 13b, and 13x and the signal switching circuit 14 operating so as to switch the interconnection between the demodulator circuits 11a to 11d and the decoder circuit 12a as described above, the decoder circuit 12a is always fed with the signal received by whichever of the antennas 1a to 1d is yielding the best reception condition, i.e., the signal with the least noise or lowest bit error rate. The decoder circuit 12a then decodes the signal fed thereto to retrieve video and audio signals, which are then fed through the synthesizing circuit 15 to a display and loudspeakers (of which none is illustrated) so that pictures and sounds are reproduced and outputted. All this while, the operation of the decoder circuit 12b is kept halted.

Multiple-Screen Display Reception Operation

When the multiple-screen display function is used, as in the first embodiment, the picture reproduced from the video signal decoded by the decoder circuit 12a is displayed on the main screen, and the picture reproduced from the video signal decoded by the decoder circuit 12b is displayed on the sub screen. In addition, only the sound reproduced from the audio signal decoded by the decoder circuit 12a is reproduced. The operation here can be selected between a diversity mode in which both of the pair tuner circuits 20a and 20b are kept operating and a power-saving mode in which only one of the pair tuner circuits 20a and 20b is kept operating while the other is kept off.

1. Operation in Diversity Mode

In this mode, the switch SW1 connects the comparison circuit 13a to the comparison circuit 13x and the signal switching circuit 14, and the switch SW2 connects the comparison circuit 13b to the comparison circuit 13x and the signal switching circuit 14. The pair tuner circuit 20a outputs whichever of the signals from the demodulator circuits 11a and 11b has less noise or a lower bit error rate, and the pair tuner circuit 20b outputs whichever of the signals from the demodulator circuits 11c and 11d has less noise or a lower bit error rate. These signals outputted from the pair tuner circuits 20a and 20b are then individually fed through the switches SW1 and SW2 to the comparison circuit 13x and the signal switching circuit 14.

Thus, first, the comparison circuit 13x compares the noises and bit error rates of the signals fed from the pair tuner circuits 20a and 20b. Then, the channel frequencies to be selected are so set that the two tuner circuits within the pair tuner that is outputting a signal with less noise or a lower bit error rate select the channel for the main screen, and that the two tuner circuits within the pair tuner that is outputting a signal with more noise or a higher bit error rate select the channel for the sub screen. In the following descriptions, the pair tuner circuit that selects the channel for the main screen is called the "main pair tuner circuit," and the pair tuner circuit that selects the channel for the sub screen is called the "sub pair tuner circuit."

Specifically, if the signal from the pair tuner circuit 20a has less noise or a lower bit error rate, the pair tuner circuit 20a is set to be the main pair tuner circuit, with its output fed to the decoder circuit 12a, and the pair tuner circuit 20b is set to be the sub pair tuner circuit, with its output fed to the decoder circuit 12b. Here, the tuner circuits 10a and 10b within the pair tuner circuit 20a perform tuning operation for the channel frequency for the main screen, and the tuner circuits 10c and 10d within the pair tuner circuit 20b perform tuning operation for the channel frequency for the sub screen.

By contrast, if the signal from the pair tuner circuit 20b has less noise or a lower bit error rate, the pair tuner circuit 20b is set to be the main pair tuner circuit, with its output fed to the decoder circuit 12a, and the pair tuner circuit 20a is set to be the sub pair tuner circuit, with its output fed to the decoder circuit 12b. Here, the tuner circuits 10c and 10d within the pair tuner circuit 20b perform tuning operation for the channel frequency for the main screen, and the tuner circuits 10a and 10b within the pair tuner circuit 20a perform tuning operation for the channel frequency for the sub screen.

The comparison circuit 13x and the signal switching circuit 14 operate in a similar manner to the comparison circuit 13x and the signal switching circuit 14 in the first embodiment so that the pair tuner circuit that is outputting a signal with less noise or a lower bit error is kept connected to the decoder circuit 12a and the pair tuner circuit that is outputting a signal with more noise or a higher bit error is kept connected to the decoder circuit 12b. That is, the comparison circuit 13x and the signal switching circuit 14 perform operations similar to those shown in the flow chart of FIG. 3.

Accordingly, when the pair tuner circuit 20a is the main pair tuner circuit, if the signal from the pair tuner circuit 20b is recognized to have come to have less noise or a lower bit error rate than the signal from the pair tuner circuit 20a by the comparison circuit 13x, the pair tuner circuit 20a is now set to be the sub pair tuner circuit, and the pair tuner circuit 20b is set to be the main pair tuner circuit. Now, the channel frequencies are so switched that the tuner circuits 10a and 10b perform tuning operation for the channel for the sub screen and that the tuner circuits 10c and 10d perform tuning operation for the channel for the main screen. Moreover, the signal switching circuit 14 connects the switch SW1 to the decoder circuit 12b and connects the switch SW2 to the decoder circuit 12a so that now the signal from the pair tuner circuit 20a is fed to the decoder circuit 12b and the signal from the pair tuner circuit 20b is fed to the decoder circuit 12a.

During these operations, the pair tuner circuits 20a and 20b each perform reception operation on the principle of diversity reception by using two antennas. Specifically, the pair tuner circuit 20a selects whichever of the signals fed from the demodulator circuits 11a and 11b has less noise or a lower bit error rate, and feeds it to the switch SW1. Likewise, the pair tuner circuit 20b selects whichever of the signals fed from the demodulator circuits 11c and 11d has less noise or a lower bit error rate, and feeds it to the switch SW2. Thus, the pair tuner circuit 20a outputs the signal received via whichever of the antennas 1a and 1b is yielding better reception condition, and the pair tuner circuit 20b outputs the signal received via whichever of the antennas 1c and 1d is yielding better reception condition.

2. Operation in Power-Saving Mode

In this mode, if the signal from the pair tuner circuit 20a is recognized to have less noise or a lower bit error rate by the comparison circuit 13x, the switch SW1 connects the demodulator circuit 11a to the comparison circuit 13x and the signal switching circuit 14, and the switch SW2 connects the demodulator circuit 11b to the comparison circuit 13x and the signal switching circuit 14. Moreover, the pair tuner circuit 20b is turned off. By contrast, if the signal from the pair tuner circuit 20b is recognized to have less noise or a lower bit error rate by the comparison circuit 13x, the switch SW1 connects the demodulator circuit 11c to the comparison circuit 13x and the signal switching circuit 14, and the switch SW2 connects the demodulator circuit 11d to the comparison circuit 13x and the signal switching circuit 14. Moreover, the pair tuner circuit 20a is turned off.

Through these operations, when the pair tuner circuit 20b is turned off, the antennas 1a and 1b, demodulator circuits 11a and 11b, comparison circuit 13x, signal switching circuit 14, decoder circuits 12a and 12b, and synthesizing circuit 15 together form a reception apparatus similar to that of the first embodiment. On the other hand, when the pair tuner circuit 20a is turned off, the antennas 1c and 1d, demodulator circuits 11c and 11d, comparison circuit 13x, signal switching circuit 14, decoder circuits 12a and 12b, and synthesizing circuit 15 together form a reception apparatus similar to that of the first embodiment. Thus, in either case, operations similar to those performed in the first embodiment are performed according to the flow chart of FIG. 3. This makes it possible to reproduce the picture displayed on the main screen always in good condition.

In this embodiment, when the reception apparatus is operated in the diversity mode, it is possible to reproduce, on the main screen, the video signal obtained from whichever of the antennas is yielding the best reception condition. Thus, it is possible to reproduce the picture displayed on the main screen always in good condition. Moreover, this can be achieved through a flow of operations simpler than that used in the second embodiment. On the other hand, in the power-saving mode, it is possible to keep one of the pair tuner circuits off, and thus to save power consumption.

In the second and third embodiments, the circuits in the stages succeeding the demodulator circuits may be realized with a microcomputer so that the operations of the second or third embodiments are selected on a software basis. This permits more flexible operation, and thus helps achieve optimum reception operation that suits the actual environment in which the reception apparatus is installed.

In all the first to third embodiments, the comparison circuit(s) checks the reception condition of the individual antennas according to the signals from the demodulator circuits. It is, however, also possible to check the reception condition of the individual antennas by checking the electric power of the signals from the tuner circuits. In this case, the signal switching circuit first selects the demodulator circuits corresponding respectively to the tuner circuits, and then feeds the signals from the tuner circuits to the demodulator circuits selected as corresponding thereto.

Reception apparatuses according to the present invention are applicable to reception apparatuses, like portable broadcast reception apparatuses and car-mounted broadcast reception apparatuses for receiving broadcast signals such as television broadcasts and portable telephone apparatuses, that conduct communication while moving around during which time the directivity of antennas keeps varying.

What is claimed is:

1. A reception apparatus comprising:
a plurality of antennas, each configured to receive broadcast signals including video signals;
a plurality of tuners, each tuner respectively connected to one of the plurality of antennas and being configured to select a particular signal among a plurality of signals provided by a corresponding antenna;
a comparator for comparing a reception condition of each particular signal obtained by each of the plurality of tuners with one another to provide an indication of the particular antenna and corresponding tuner providing the best reception condition, the comparator thereafter monitoring the reception condition of the signal obtained by being selected by the tuner connected to the particular antenna so that, if the comparator detects deterioration of the reception condition provided by the particular antenna, the comparator again compares the reception condition of the signals obtained by being selected by the plurality of tuners with one another to provide an indication of the particular antenna and corresponding tuner providing the best reception condition; and
a plurality of screens, each screen reproducing a different picture corresponding to the particular signal selected by a respective tuner, one of the plurality of screens being a main screen, wherein
the plurality of antennas perform a reception operation on a principle of diversity reception,
the plurality of screens comprise the main screen and another screen, and the plurality of different channels comprise two different channels,
when broadcast signals of a plurality of different channels are received by each of the plurality of antenna to reproduce the different picture of each of the plurality of screens, with each picture corresponding to a different channel,
first, the comparator recognizes an antenna recognized to be providing the best reception condition and a tuner corresponding thereto and an antenna recognized to be providing the second best reception condition and a tuner corresponding thereto,
then, the comparator keeps comparing the reception condition of the plurality of antennas and corresponding tuners with one another,
the antenna and corresponding tuner that the comparator indicates is providing the best reception condition are set to be a first antenna and a first tuner,
the antenna and corresponding tuner that the comparator indicates is providing the second best reception condition are set to be a second antenna and a second tuner,
the first antenna and the first tuner are connected to the main screen and the second antenna and the second tuner are connected to the other screen,
thereafter, the comparator monitors the reception condition of the signals obtained by being selected by the first and second tuners so that,
  if the comparator detects deterioration of the reception condition provided by the first antenna, the comparator again compares the reception condition of the signals obtained by being received by the plurality of tuners with one another and sets the antenna providing the best reception condition and the corresponding tuner to be the first antenna and the first tuner, and
  if the comparator detects deterioration of the reception condition provided by the second antenna, the comparator again compares the reception condition of the signals obtained by being received by the plurality of tuners other than the first tuner with one another and sets the antenna providing the best reception condition and the corresponding tuner to be the second antenna and the second tuner, and
the first antenna and the first tuner are connected to the main screen and the second antenna and the second tuner are connected to the other screen.

2. The reception apparatus of claim 1, further comprising;
a demodulator connected to each of the plurality of tuners, wherein
the particular signal selected by each of the plurality of tuners is demodulated by a corresponding demodulator and fed to the comparator, and
the comparator compares one of either noise and bit error rates of said each particular signal with one another to provide the indication of the particular antenna and corresponding tuner providing the best reception condition.

3. A reception apparatus comprising:
a plurality of antennas, each configured to receive broadcast signals including video signals;
a plurality of tuners, each tuner respectively connected to one of the plurality of antennas and being configured to select a particular signal among a plurality of signals provided by a corresponding antenna;
a comparator for comparing a reception condition of each particular signal obtained by each of the plurality of tuners with one another to provide an indication of the particular antenna and corresponding tuner providing the best reception condition, the comparator thereafter monitoring the reception condition of the signal obtained by being selected by the tuner connected to the particular antenna so that, if the comparator detects deterioration of the reception condition provided by the particular antenna, the comparator again compares the reception condition of the signals obtained by being selected by the plurality of tuners with one another to provide an indication of the particular antenna and corresponding tuner providing the best reception condition; and a plurality of screens, each screen reproducing a different picture corresponding to the particular signal selected by a respective tuner, one of the plurality of screens being a main screen, wherein the plurality of antennas perform a reception operation on a principle of diversity reception, the plurality of screens comprise the main screen and another screen, and the plurality of different channels comprise two different channels, when broadcast signals of a plurality of different channels are received by each of the plurality of antenna to reproduce the different picture of each of the plurality of screens, with each picture corresponding to a different channel, first, the comparator indicates the antenna and corresponding tuner that is providing the best reception condition, and indicates the antenna and corresponding tuner that is providing the second best reception condition, and then supply of electric power to all other tuners is stopped, the comparator keeps comparing the reception condition of the two antennas and corresponding tuners, that are left operating, with each other, the antenna and corresponding tuner that the comparator indicates is providing the best reception condition are set to be a first antenna and a first tuner, the antenna and corresponding tuner that the comparator indicates is providing the second best reception condition are set to be a second antenna and a second tuner, first antenna and the first tuner are connected to the main screen and the second antenna and the second tuner are connected to the other screen, thereafter, the comparator monitors the reception condition of the signal obtained by being selected by the first tuner so that, if the comparator detects deterioration of the reception condition provided by the first antenna, the comparator compares the reception condition provided by the first and second antennas with each other in order to set anew whichever antenna and tuner are provided the beffer reception condition as the first antenna and the first tuner and whichever antenna and tuner are providing a poorer reception condition as the second antenna and the second tuner, and the first antenna and the first tuner are connected to the main screen and the second antenna and the second tuner are connected to the other screen.

4. A reception apparatus comprising:

a plurality of antennas, each configured to receive broadcast signals including video signals;

a plurality of tuners, each tuner respectively connected to one of the plurality of antennas and being configured to select a particular signal among a plurality of signals provided by a corresponding antenna;

a comparator for comparing a reception condition of each particular signal obtained by each of the plurality of tuners with one another to provide an indication of the particular antenna and corresponding tuner providing the best reception condition, the comparator thereafter monitoring the reception condition of the signal obtained by being selected by the tuner connected to the particular antenna so that, if the comparator detects deterioration of the reception condition provided by the particular antenna, the comparator again compares the reception condition of the signals obtained by being selected by the plurality of tuners with one another to provide an indication of the particular antenna and corresponding tuner providing the best reception condition; and a plurality of screens, each screen reproducing a different picture corresponding to the particular signal selected by a respective tuner, one of the plurality of screens being a main screen, wherein the plurality of antennas perform a reception operation on a principle of diversity reception, the plurality of antennas are equally divided into first and second antenna groups, the plurality of screens comprise the main screen and another screen, and the plurality of different channels comprise two different channels, when broadcast signals of a plurality of different channels are received by each of the plurality of antenna to reproduce the different picture of each of the plurality of screens, with each picture corresponding to a different channel, the comparator keeps comparing, for each of the first and second antenna groups, the reception condition of the plurality of antennas and corresponding tuners with one another, the comparator indicates, of the plurality of antennas of the first antenna group, the antenna and corresponding tuner that is providing the best reception condition, and indicates, of the plurality of antennas of the second antenna group, the antenna and corresponding tuner that is providing the best reception condition, and the comparator then compares the reception condition of the antenna and corresponding tuner selected from the first antenna group and the antenna and corresponding tuner selected from the second antenna group to provide an indication of the antenna and corresponding tuner providing the best reception condition, the antenna and corresponding tuner that the comparator indicates is providing the best reception is connected to the main screen and the other antenna and corresponding tuner is connected to the other screen, thereafter, the comparator monitors the reception condition of the signal obtained by being selected by the tuner connected to one, providing the better reception condition, of the two antenna selected as providing the best reception condition in the first and second antenna groups respectively so that, if the comparator detects deterioration of the reception condition provided by said one, providing the better reception condition, of the two antennas selected as providing the best reception condition in the first and second antenna groups respectively, the comparator again compares the reception condition provided by the two antennas selected as providing the best reception condition in the first and second antenna groups respectively in order to connect one of said two antennas providing the better reception condition and the tuner connected thereto to the main screen and connect the other of said two antennas and the tuner connected thereto to the other screen.

5. The reception apparatus of claim 4, wherein the first and second antenna groups each include two antennas, and one of either a spatial distance between the two antennas of the first antenna group and a spatial distance between the two antennas of the second antenna group is largest among spatial distances between the four antennas.

* * * * *